United States Patent Office.

JOHN H. STARCK, OF MILWAUKEE, WISCONSIN.

Letters Patent No. 77,673, dated May 5, 1868.

---

IMPROVEMENT IN GLAZING AND COLORING TOBACCO-PIPES.

---

*The Schedule referred to in these Letters Patent and making part of the same.*

---

TO ALL WHOM IT MAY CONCERN:

Be it known that I, JOHN H. STARCK, of the city and county of Milwaukee, and State of Wisconsin, have invented a new and useful Improvement in the Manufacture of Tobacco-Pipes; and I do hereby declare that the following is a full, clear, and exact description thereof, which will enable those skilled in the art to make and use the same.

My tobacco-pipes are moulded and burned in the ordinary manner; my improvement being for glazing and coloring the pipes after they are burned, giving them a fine finish, and this I do by first dipping them in a solution made by mixing, say, three pints of water with three pints of milk, and about an ounce of gelatine dissolved in a quart of water, making about a gallon in all, and in about the same proportions for a larger or smaller quantity of the solution.

As soon as the pipes are dry after dipping them in this solution, which will be in a few minutes, I apply gum-shellac, dissolved in alcohol or any other solvent, with a brush, covering the outer surface of the pipes, applying two coats of the shellac. I then place the pipes in a rack, of iron or other metal wire, and set them on the top of a heated furnace or stove, and let them remain till the desired color is obtained, which will be, when slightly heated, of the color of the clay, and, as the heat increases, changing to a yellow, and so on to a deep brown.

To produce other colors, instead of the second coat of shellac I apply a stain, made by steeping any of the dye-woods (according to the color wanted) in alcohol. Instead of the solution of milk, water, and gelatine for the first coat, I sometimes use the whites of eggs for the first coat, making the application with a cloth or brush, following with gum-shellac and coloring-matter.

By this process I produce a fine, smooth, glazed colored surface on tobacco-pipes made of pipe-clay, or of any ordinary clay.

What I claim as my invention, and desire to secure by Letters Patent, is—

1. The process of glazing tobacco-pipes by the use of milk, gelatine, water, and shellac, substantially as described.

2. The process of glazing tobacco-pipes by the use of the whites of eggs and gum-shellac, substantially as described.

3. The process of coloring tobacco-pipes by the use of the dye-wood solution, substantially as described.

JOHN H. STARCK.

Witnesses:
   J. B. SMITH,
   FRANCIS BENINGHAUSEN.